United States Patent [19]
Nagai et al.

[11] Patent Number: 5,245,235
[45] Date of Patent: Sep. 14, 1993

[54] MOTOR HAVING INDEX DETECTION MECHANISM USED FOR DISC APPARATUS AND DISC APPARATUS USING SUCH A MOTOR

[75] Inventors: Michiaki Nagai; Takahiro Sakaguchi, both of Tokyo, Japan

[73] Assignee: Teac Corporation, Tokyo, Japan

[21] Appl. No.: 884,068

[22] Filed: May 15, 1992

[30] Foreign Application Priority Data

May 20, 1991 [JP] Japan .................. 3-35549

[51] Int. Cl.$^5$ .................. H02K 7/14; H02K 11/00; H02K 1/22; G11B 17/08
[52] U.S. Cl. .................. 310/67 R; 310/68 B; 310/268; 360/98.07
[58] Field of Search ............... 310/67 R, 68 R, 68 B, 310/268, 156, DIG. 3; 369/266; 360/98.07, 99.04, 99.08

[56] References Cited

U.S. PATENT DOCUMENTS

| | | | |
|---|---|---|---|
| 4,556,829 | 12/1985 | von der Heide | 318/254 |
| 4,818,907 | 4/1989 | Shirotori | 310/67 B |
| 4,980,587 | 12/1990 | Yonei et al. | 310/67 R |
| 4,992,688 | 2/1991 | Cap et al. | 310/71 |
| 5,001,581 | 3/1991 | Elsasser et al. | 360/99.08 |
| 5,006,943 | 4/1991 | Elsasser et al. | 360/99.08 |
| 5,047,677 | 9/1991 | Mineta et al. | 310/67 R |
| 5,124,863 | 6/1992 | Koizumi et al. | 360/99.08 |

FOREIGN PATENT DOCUMENTS

| | | | |
|---|---|---|---|
| 0030412 | 3/1979 | Japan | 310/67 R |
| 0272853 | 11/1987 | Japan | 310/269 |

Primary Examiner—Stephen L. Stephan
Assistant Examiner—C. LaBalle
Attorney, Agent, or Firm—Andrus, Sceales, Starke & Sawall

[57] ABSTRACT

A spindle motor able to reduce leaking of magnetic flux of an index magnet to a magnetic head of a disc apparatus. In an axial gap type spindle motor having a rotor case rotatably supported by a base plate, an index magnet is provided to a face of the rotor case opposite to the base plate. A hall device is provided in an open space between a plurality of coils arranged radially on the base plate at a position opposite to the index magnet. A magnetic flux forms a closed loop by passing through the rotor case, and thus leaking of magnetic flux to the outside is reduced.

13 Claims, 8 Drawing Sheets

MOTOR HAVING INDEX DETECTION MECHANISM USED FOR DISC APPARATUS AND DISC APPARATUS USING SUCH A MOTOR

BACKGROUND OF THE INVENTION

The present invention relates to a motor having an index detection mechanism used for a disc apparatus and a disc apparatus using such a motor, and more particularly to a motor having an index detection mechanism comprising an index magnet and a hall device for detecting an index of a rotor of the motor and a disc apparatus using such a motor.

Conventionally, a radial gap type motor is known, which motor is a spindle motor used for rotationally driving a disc for a disc apparatus. This type of motor comprises a stator including coils arranged on a base plate and a rotor including magnets mounted on a rotor case. This construction requires each coil having a large cross section to have a number of turns sufficient to generate a predetermined magnetic flux, and thus the motor has to be made quite thick. Accordingly, there is a limit to how far the thickness of a disc apparatus using a radial gap type motor can be minimized.

Recently, an axial gap type motor, in which coils and magnets are arranged in the direction of an axis of a spindle shaft, has been used. In this type of motor, since a space between respectively opposing coils and a magnet extends in a radial direction of the motor, such a space can be wide. This construction allows the thickness of this axial gap type motor to be less than that of a radial gap type motor. Therefore, the thickness of a disc apparatus using the axial type motor can be minimized more than can the thickness of a disc apparatus using the radial gap type motor.

However, a technique for minimizing the thickness of the coils in a radial gap type motor has been developed and thus a radial gap type motor as thin as the axial type motor has become available for production.

Due to this minimization of the thickness of a disc apparatus, a distance between a magnet of an index detection mechanism and a magnetic head for a disc apparatus, nay now be minimized.

FIG. 1 is a side view of an example of an index detection mechanism in a disc apparatus using a conventional motor. Reference numeral 1 indicates a spindle motor, 6 a spindle shaft and 4 a base plate having parts for the motor provided thereon. A conventional index detection mechanism 10 comprises an index magnet 3 provided on a rotor case 2 and a hall device 5 mounted on a base plate 4. The index magnet 3 is provided to a part of a side face of an outer periphery of the rotor case 2, which case is a rotational part of the spindle motor 1. A Hall device 5 is mounted in a position separate from opposite to the index magnet 3 on the base plate 4, which plate is provided with a stationary part of the spindle motor 1. More specifically, the Hall device 5 is mounted in a position slightly apart from the outer periphery of the rotor case 2 in the radial direction thereof.

The index magnet 3 rotates with each rotation of the rotor case 2 and passes a very short distance from the Hall device 5, every rotation of the rotor case. At the moment of perigee between the Hall device 5 and the index magnet 3, a magnetic flux generated by the index magnet 3 goes across the Hall device 5 and a resulting electric signal is output from the Hall device 5. The position where the electric signal is output becomes an index point. A disc position of a disc cartridge attached to the rotor case 2, placed against the rotor case 2, is determined by the spindle shaft 6 and a drive pin 9. This allows a disc to always be attached to the same position on the rotor case 2. By the above mentioned construction, a signal for a disc index can be obtained.

According to the arrangement of the component parts of the above index detection mechanism 10, the index magnet 3 is positioned close to a magnetic head of a disc apparatus with miniaturization of the thickness of the disc apparatus. This causes a leaking magnetic flux A to go through the heads 7,8 and results in a problem in that the leaking magnetic flux A affects the recording and playing function of the heads 7,8.

SUMMARY OF THE INVENTION

It is a general object of the present invention to provide a motor, for a disc apparatus, for example, having an improved index detection mechanism, and also a disc apparatus using such a motor.

A more specific object of the present invention is to provide a motor for a disc apparatus, and a disc apparatus using such a motor, which disc apparatus can reduce the leaking of magnetic flux of an index magnet, and thus the effects of the leaking on a magnetic head.

In order to achieve the above-mentioned objects, the present invention comprises:

A motor for driving a disc for a disc apparatus, which motor includes a stator provided on a base plate, a motor shaft perpendicularly and rotatably supported on the base plate, and a rotatable rotor fixed to the motor shaft and positioned parallel to the stator, the motor comprising:

a magnet provided at an inner side of the rotor, opposite to the base plate; and detecting means, provided at a position corresponding to a revolutional orbit of the magnet, on a face of the base plate opposite to the rotor, for outputting a signal upon perigee of the magnet passing by with each rotation of the rotor.

According to the present invention, a magnetic flux from an index magnet forms a closed loop, passing through a rotor case of a rotor, and thus there is no leakage of magnetic flux and so there are no effects to the external portion of the rotor, at an area on the opposite side of the base plate. Therefore, in a disc apparatus of the present invention having a thin thickness, the effect of the leaking magnetic flux upon a magnetic disc is reduced, and the magnetic head of the present invention can perform recording and playing better than conventional ones.

Further, since the index magnet does not protrude in the radial direction, an outer periphery of the rotor case, and since a sensor is positioned inside an outer periphery of the rotor case, miniaturization of a spindle motor, and miniaturization of a disc apparatus using such a motor can be realized.

Other objects, features and advantages of the present invention will become more apparent from the following detailed description when read in conjunction with the accompanying drawings.

DETAILED DESCRIPTION OF THE PREFERRED EMBODIMENTS

Figure 2A:
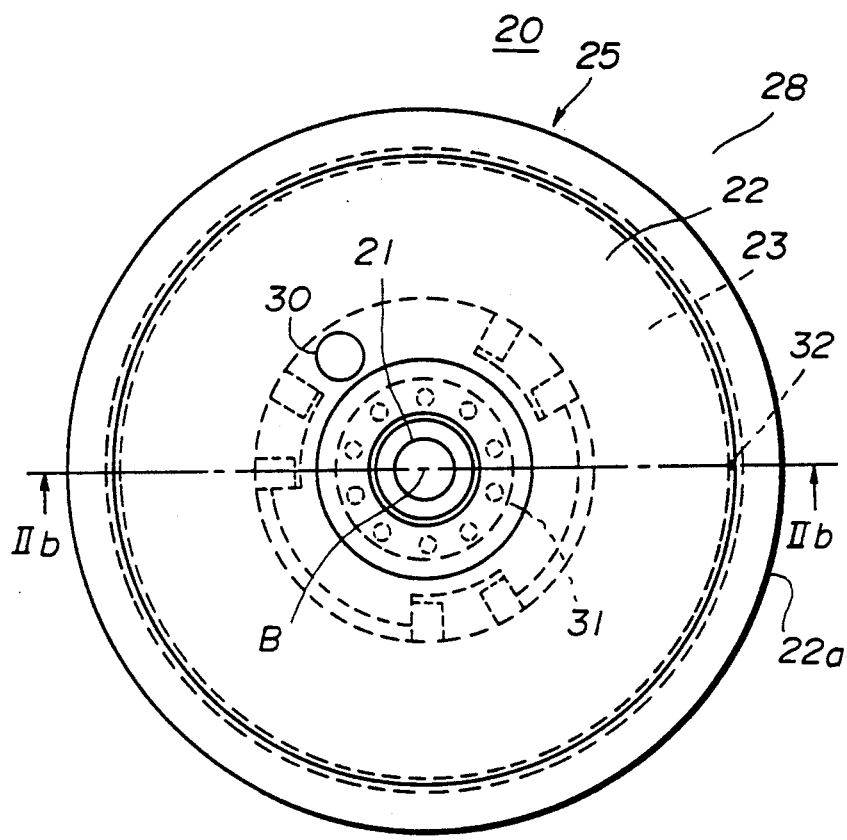
FIGS. 2A and 2B are respectively a plane view and a cross sectional view of a first embodiment of a spindle motor of the present invention.
Figure 2B:
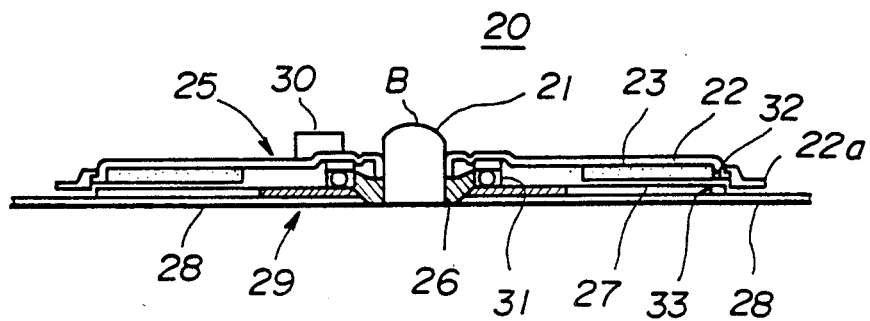

Referring to FIGS. 2A,2B, FIG. 2B is a cross sectional view of a first embodiment of a spindle motor of the present invention taken along line IIb—IIb in FIG. 2A. A spindle motor 20 is the axial gap type motor mentioned above. A rotor 25 includes a spindle shaft 21, a rotor case 22 fixed to the spindle shaft 21, and a magnet 23 positioned on an outer portion of the bottom face of the rotor case 22. A stator 29 includes a bearing 26, which supports the spindle shaft 21, and a plurality of coils 27 arranged opposite to the magnet 23 on a base plate 28. A supporting member 31, which rotatably supports the rotor 25, is provided between the rotor 25 and the stator 29. By means of this supporting member 31, a small distance is maintained between the magnet 23 of the rotor 25 and the coils 27 of the stator 29. A pin 30 for driving and positioning of a disc (not shown) is provided on a portion of the top surface of the rotor case 22. The rotor case 22 further includes a magnet 22a as a frequency generator, which magnet comprises a magnet having N poles and S poles alternately arranged on the circumference thereof. The magnetic flux of the magnet 22a does not affect a magnetic disc of a disc apparatus because the intensity of the magnetic flux of the magnet 22a is very weak as compared to that of the magnet 23.

Figure 3:
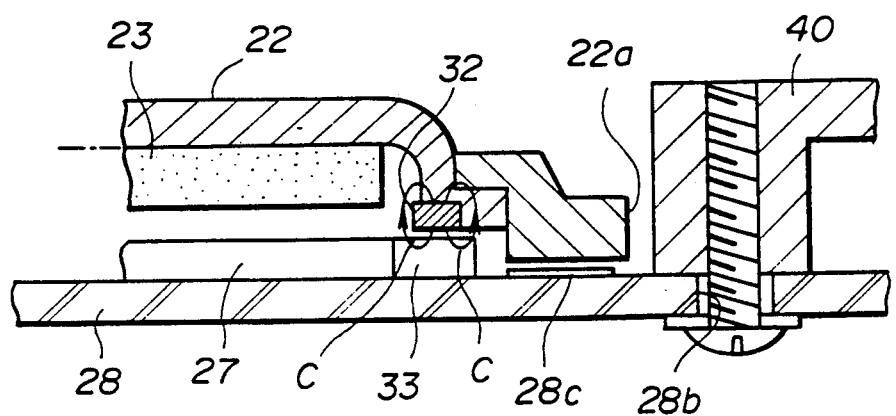
FIG. 3 is an enlarged sectional view of the outer periphery of the spindle motor shown in FIGS. 2A and 2B.

FIG. 3 is an enlarged sectional view of the outer periphery of the spindle motor shown in FIGS. 2A and 2B. An index magnet 32 which detects a rotational position of the rotor case 22 is provided inside the side face of the rotor case 22, opposite to the base plate 28. In FIG. 2A, the index magnet 32, which can not be actually shown, is indicated by a portion colored black for convenience. The index magnet 32, as is best illustrated in FIG. 3, is fixed in a recess formed on a portion of the side of the rotor case 22, opposite to the base plate 28.

A Hall device 33, which is a sensor, outputs an electric signal due to the magnetic flux generated by the index magnet 32. This device is mounted on a portion on the base plate 28 at a distance, in a radial direction from a center B (indicated in FIG. 2A) of the spindle 21 equal to the distance of the index magnet 32 from the center B. The index magnet 32 and the hall device 33 are slightly separated from each other in a direction of along the axis of the spindle shaft 21.

Figure 4:
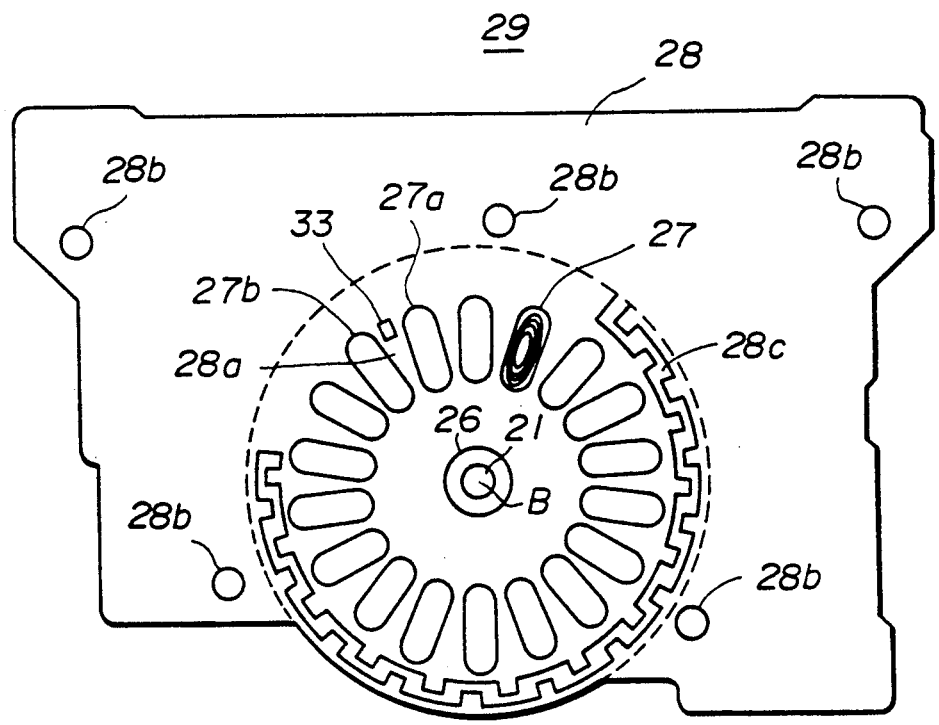
FIG. 4 is a plane view of a stator of a spindle motor indicated in FIGS. 2A, 2B.

As is best illustrated in FIG. 4, a circuit pattern 28c formed of a copper foil, for example, is provided on a portion of the base plate 28 opposite to the magnet 22a. An electric current is generated in the circuit pattern 28c when the magnet 22a passes above the circuit pattern 28c. A rotational speed of the rotor 25 is determined from the intensity of the generated electric current.

FIG. 4 is a plane view of a stator of the spindle motor shown in FIGS. 2A and 2B. Each coil of the plurality of coils 27, each of which is wound in a plane like form, is arranged radially around the center B of the spindle shaft 21 on the base plate 28. The Hall device 33 mentioned above is positioned in a space between an adjacent pair of coils 27a and 27b. The distance between the Hall device 33 and the center B is equal to the distance between the index magnet 32 and the center B, and thus the Hall device 33 and the magnet 32 are positioned such that at some point during the rotation of the rotor they are directly opposite each other.

On the base plate 28, as shown in FIG. 3, screw holes 28b are provided so that the base plate 28 can be mounted on to a frame 40, which is a main body of the disc apparatus. A total of five screw holes 28b are provided, three being located around the spindle motor 20 and two being located near both sides of the base plate 28. Further, other electronic parts, not shown in FIG. 4, are mounted around the spindle motor on the base plate 28.

In the spindle motor 20, the index magnet 32 rotates with each rotation of the rotor case 22, and passes a very short distance away from the Hall device 33 with each rotation of the rotor case 22. Due to this movement of the magnet 32, an index of the rotor case 22, that is, an index of a disc when a disc cartridge is loaded, is output from the Hall device 33.

Since the index magnet 32 is mounted on an inner portion of the side face of the rotor case 22 opposite to the base plate 28, a magnetic flux C from the index magnet 32 forms a closed loop by passing through the rotor case 22, which is formed of a steel plate. Accordingly, most of the magnetic flux passes through the inside of the rotor case 22 and thus leaking of the magnetic flux is reduced. Therefore, in the disc apparatus of the present invention the effect of the magnetic flux leaking from the index magnet on the magnetic disc is reduced much more than in the case of the conventional disc apparatus, and thus the magnetic heads can perform better recording and playing than can the conventional magnetic head.

Additionally, since the index magnet 32 is provided in a recess formed in a portion of the rotor case 22 and the Hall device 33 is positioned in a space between the coils 27a and 27b, the size of the spindle motor 20 does not become larger than that of the conventional one. Further, since it is not required to that the shapes of other component parts of the disc apparatus, nor their arrangements be changed, leaking of magnetic flux can be reduced without increasing the manufacturing cost of the disc apparatus.

Figure 5:
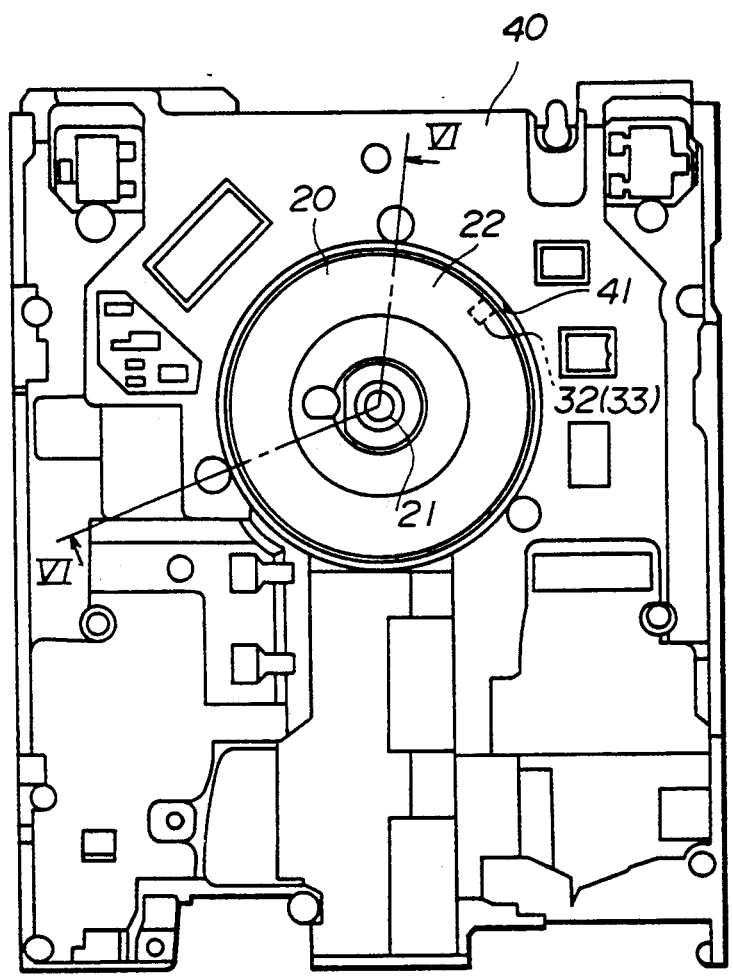
FIG. 5 is a plane view of an embodiment of a disc apparatus of the present invention.
Figure 6:
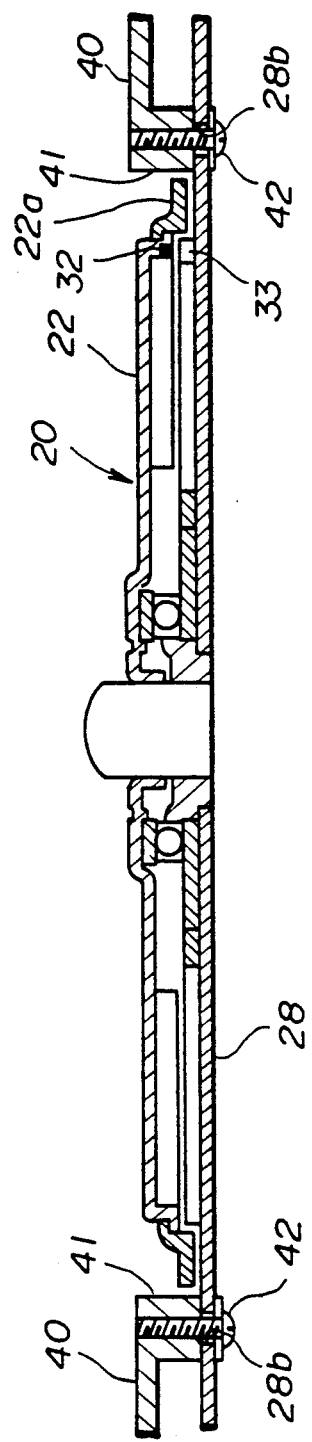
FIG. 6 is a cross sectional view of the spindle motor of FIG. 2B taken along line VI—VI in FIG. 5.

FIG. 5 is a plane view of an embodiment of a disc apparatus of the present invention and FIG. 6 is a cross sectional view taken along line VI—VI in FIG. 5. The spindle motor 20 of a first embodiment of the present invention is mounted on the disc apparatus of FIG. 5. A procedure of mounting the spindle motor 20 on the disc apparatus 50 is as follows. First the rotor 25 is placed on the base plate 28, then the spindle motor 20 is assembled on the base plate 28. Next, as shown in FIGS. 5 and 6, the spindle motor 20 is inserted from the under side into the motor hole 41 provided on the frame 40. The ensemble of the base plate 28 and the spindle motor 20 are fixed to the frame 40 by fastening screws 42. In the disc apparatus 50, miniaturization of the apparatus' thickness is realized by arranging the face of the frame 40 and the top face of the spindle motor 20 in the same plane.

Figure 1:
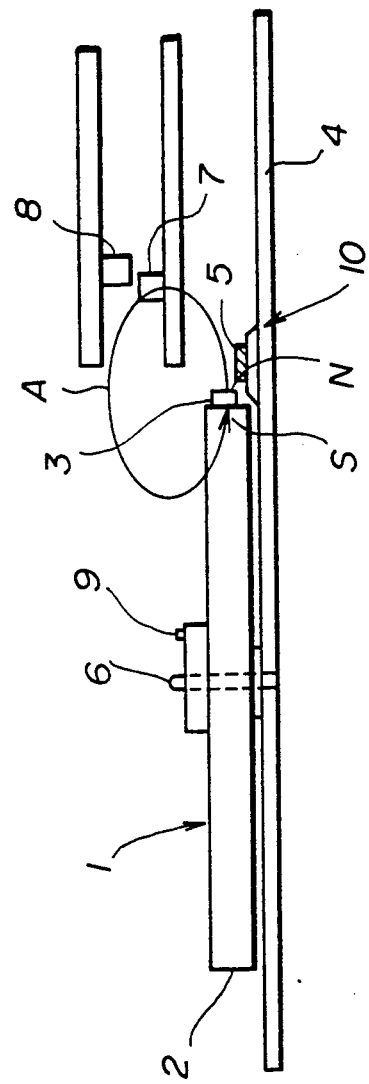
FIG. 1 is a side view of an example of an index detection mechanism in a disc apparatus using a conventional motor.

In the spindle motor 20, as mentioned above, the index magnet 32 and the Hall device 33, opposite to the index magnet 20, are both provided at an inner portion of the side face of the rotor case 22. Thus, there is no need to provide the index magnet 3 to the outer periphery of the rotor case 2 or to provide the Hall device 5, as in the conventional disc apparatus of FIG. 1. In other words, it is not required to provide the index magnet 32 and the Hall device 33 to the outer periphery of the rotor case 22. Therefore, the diameter of the motor hole 41 on the frame 40 can be minimized so as to be close to the diameter of the rotor case 22, and thus the size of the disc apparatus can be minimized.

As mentioned above, leaking of the magnetic flux of the index magnet 32 is reduced by positioning the index magnet 32 on the face of the rotor 22 opposite to the base plate 28. As a result, the magnetic head can perform better recording and playing than the conventional magnetic head. Because the size of the spindle motor 20 does not change compared to that of the conventional one, and because the space for positioning an index magnet and a Hall device outside the rotor case 22 is not needed, efficiency of arrangement of the component parts is improved.

Figure 7A:
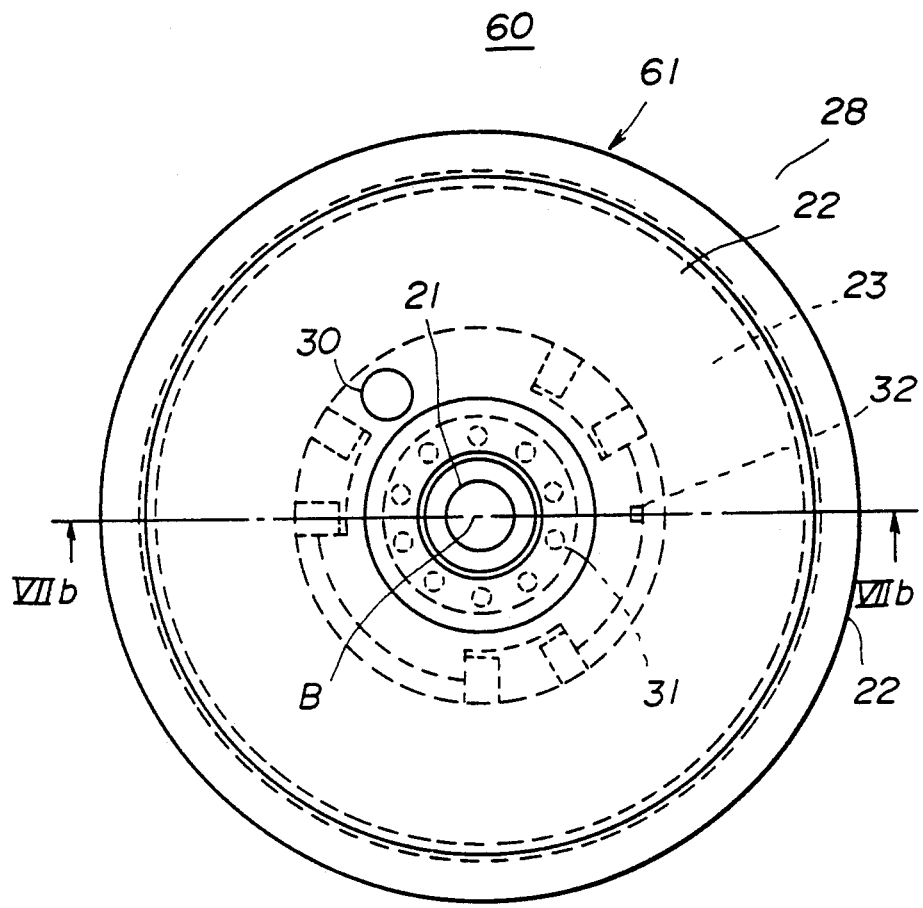
FIGS. 7A and 7B are respectively a plane view and a cross sectional view of a spindle motor 60, which is a modified example of the spindle motor 20.
Figure 7B:
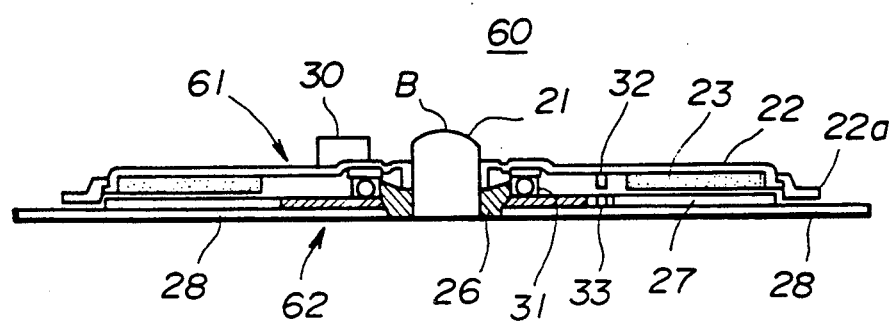

FIGS. 7A is a plane view of a spindle motor 60, which is a modified example of the spindle motor 20. FIG. 7B is a cross sectional view of a spindle motor 60 taken along line VIIb—VIIb in FIG. 7A. In FIGS. 7A and 7B, those parts that are the same as corresponding parts in FIGS. 2A and 2B are designated by the same reference numerals, and descriptions thereof will be omitted. The difference between the spindle motor 60 and the spindle motor 20 is in the position of the magnet 32 and of the Hall device 33; other parts are the same. The positions of the magnet 32 and the Hall device 33 are more near to the center B than that of the spindle motor 20. The index magnet 32 is positioned away from the magnet 22a which serves as frequency generator. This serves to nullify the possibility that a magnetic flux of the magnet 32 affects the frequency generator mentioned above.

Figure 8:
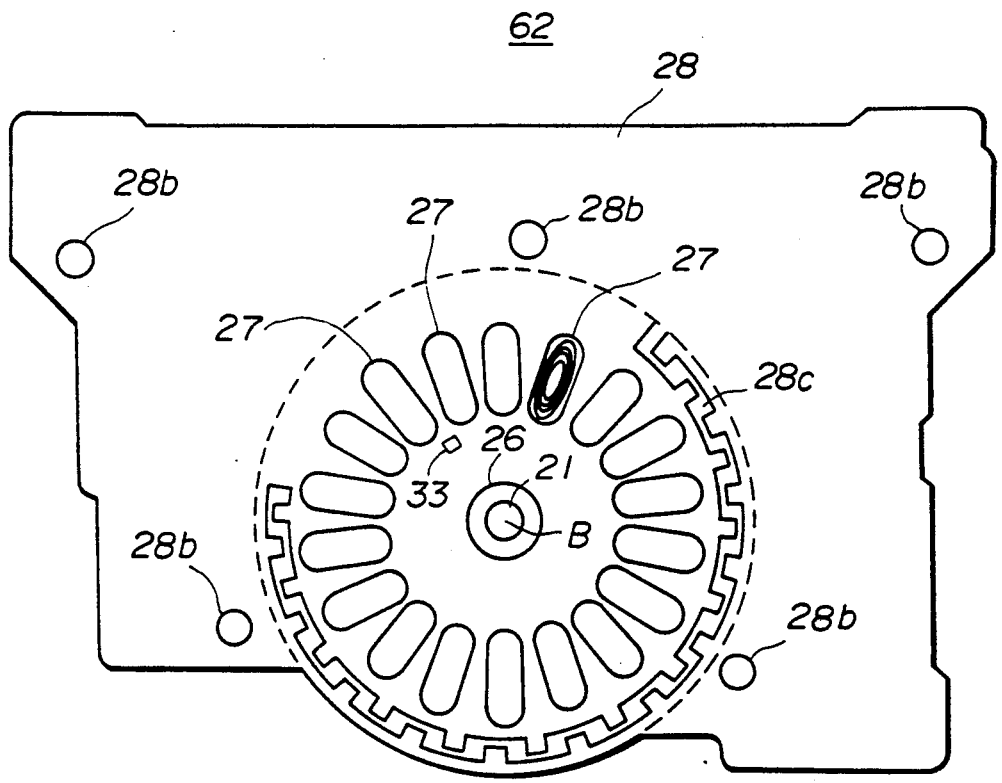
FIG. 8 is a plane view of the stator of a spindle motor shown in FIGS. 7A and 7B.

In FIG. 8 is shown another variation of this embodiment. FIG. 8 is a plane view of a stator of a spindle motor shown in FIGS. 7A, 7B. In FIG. 8, those parts that are the same as corresponding parts in FIG. 4 are designated by the same reference numerals, and descriptions thereof will be omitted. The Hall device 33, shown in FIG. 8, is mounted between the coil 27 and the spindle shaft 21 on the base plate 28.

Figure 9:
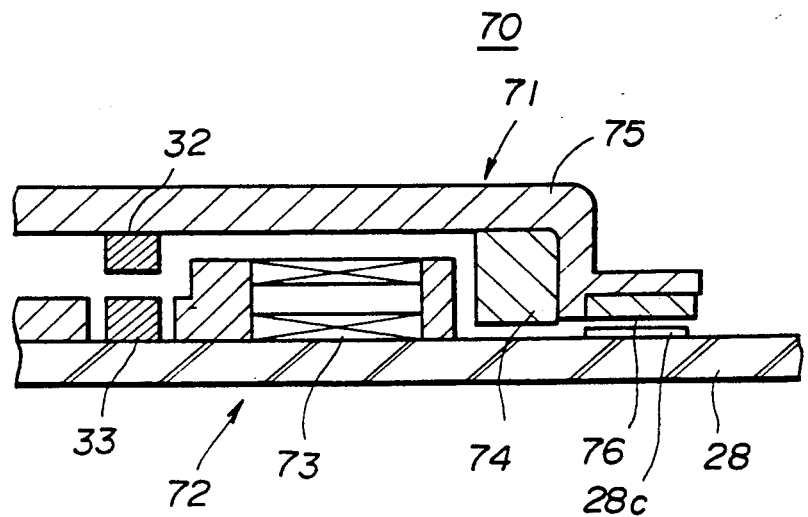
FIG. 9 shows a second embodiment of the spindle motor of the present invention.
Figure 10:
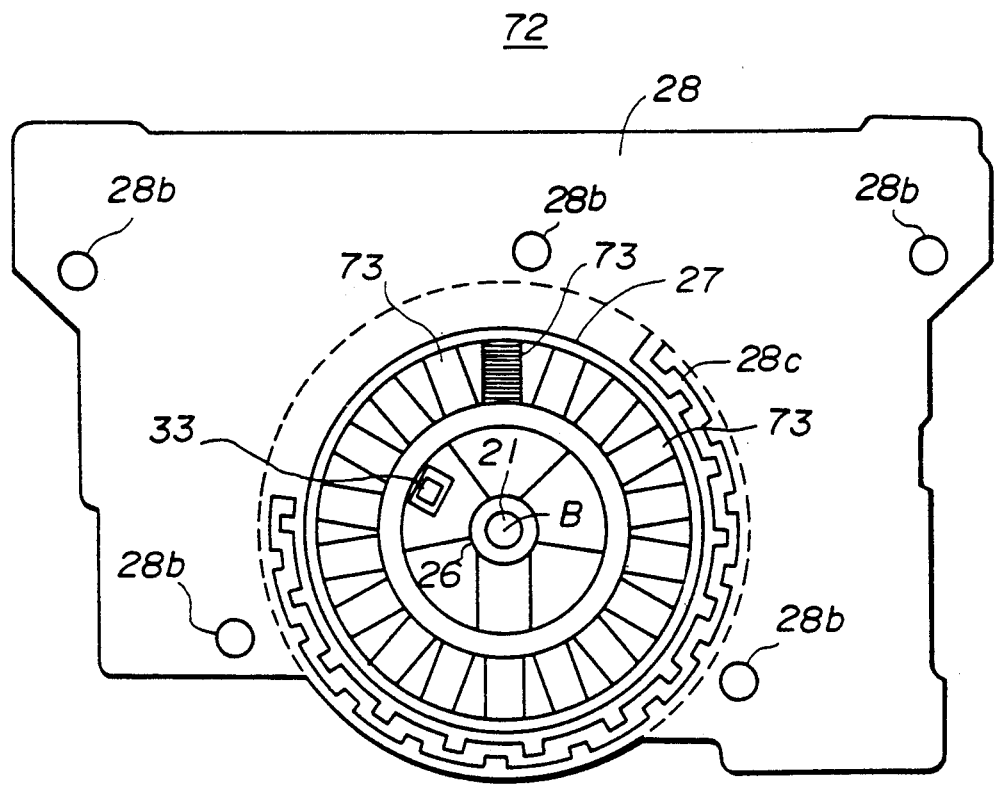
FIG. 10 is a plane view of a stator of the spindle motor shown in FIG. 9.

FIG. 9 is a second embodiment of a spindle motor of the present invention, and FIG. 10 is a plane view of the stator of the spindle motor indicated in FIG. 9. In FIG. 9 and FIG. 10, those parts that are the same as corresponding parts in FIG. 3 and FIG. 4 are designated by the same reference numerals, and descriptions thereof will be omitted. In FIG. 9 and FIG. 10, a spindle motor 70 is a radial gap type motor. A circumferential magnet 74 is provided at an inner portion of a side face of a rotor case 75. A magnet 76 as a frequency generator is provided to the outer periphery of the rotor case 75. A rotor 71 of the spindle motor 70 comprises the rotor case 75, the magnet 74 and the magnet 76.

The stator of the spindle motor 70 has the same construction as that of the spindle motor 20 mentioned above. However, the direction of the winding of the coils 73 is different from that of the coils 27 of the spindle motor 20, and the magnetic flux generated by the coils 73 is parallel to the base plate 28. The coils 73 are arranged radially from the spindle shaft 21, and the distal sides (most distant from the shaft) of the coils 73 are opposite to the magnet 74 of the rotor 71 of a small distance therefrom. The Hall device 33 is mounted on a portion between the coils 73 and the spindle shaft 21 on the base plate 28. The index magnet 32 is mounted in a portion of the rotor case 22 opposite to the Hall device 33.

The spindle motor 60 and 70 and the disc apparatus using such motors has also the same features and advantages as the spindle motor 20 and a disc apparatus using such a motor.

The present invention is not limited to the specifically disclosed embodiments, and variations and modifications may be made without departing from the scope of the present invention.

What is claimed is:

1. A motor for driving a disc for a disc apparatus, the motor including a stator provided on a base plate, a motor shaft perpendicularly and rotatably supported by the base plate, and a rotatable rotor fixed to the motor shaft and positioned parallel to the stator, wherein said stator includes a plurality of circumferentially spaced coils arranged on said base plate around said motor shaft and spaced radially from said motor shaft by a first distance, said motor further comprising:

a plurality of circumferentially space first magnets provided on an inner portion of said rotor so as to be positioned opposite to said plurality of coils in a direction parallel to the axis of said motor shaft to form a motor air gap extending normal to said shaft;

a second magnet provided on said inner portion of said rotor at a second distance radially closer to said motor shaft than said first magnets; and detecting means, provided on said base plate at a distance from said motor shaft corresponding to said second distance, for outputting a signal upon said second magnet passing by said detecting means with each rotation of said rotor.

2. The motor as claimed in claim 1, wherein a distance between the center of said motor shaft and said detecting means is equal to a distance between the center of said motor shaft and said second magnet in said rotor.

3. The motor as claimed in claim 1, wherein said detecting means comprises a Hall effect device.

4. The motor as claimed in claim 1, wherein said rotor comprises a rotor case onto which a disk is loaded, said rotor case being made of a magnetic material.

5. A disc apparatus comprising:

an integral motor structure for driving a disc for a disc apparatus, the motor structure including a base plate, a stator provided on said base plate, a motor shaft perpendicularly and rotatably supported by the base plate, and a rotatable rotor fixed to the motor shaft and positioned parallel to the stator to form a motor air gap extending normal to said shaft, said motor structure further comprising: a magnet provided on an inner side of said rotor opposite to said base plate; and detecting means provided, at a position corresponding to a revolutional orbit of said magnet, on a face of said base plate opposite to said rotor, for outputting a signal when said magnet passes by said detecting means with each rotation of said rotor; and a frame having a face wherein to mount component parts for the disc apparatus, and having also a hole extending through the frame, the diameter of which is larger than the diameter of the rotor of said motor structure.

the rotor of said motor structure being inserted into said hole of said frame from the under side of said face, said base plate being fixed to said frame to secure the integral motor structure to the frame such that the motor structure extends through the hole with a top face of said rotor and said face of said frame lying in the same plane.

6. The disc apparatus as claimed in claim 5, wherein said magnet is provided inside the outermost periphery of said rotor.

7. The disc apparatus as claimed in claim 6, wherein a distance between the center of said motor shaft and said detecting means is equal to a distance between the center of said motor shaft and said magnet in said rotor.

8. The disc apparatus as claimed in claim 5, wherein said detecting means comprises a Hall effect device.

9. The disc apparatus as claimed in claim 5, wherein said rotor includes a rotor case onto which a disc is loaded, and said magnet is buried in a face of said rotor case opposite to said base plate.

10. The disc apparatus as claimed in claim 9, wherein said rotor case is made of a magnetic material.

11. The disc apparatus as claimed in claim 10, wherein said rotor case is made of a steel plate.

12. The disc apparatus as claimed in claim 5, wherein said stator includes a plurality of circumferentially spaced coils arranged on said base plate and spaced radially from said motor shaft, and said detecting means is positioned in between a pair of adjacent ones of said coils.

13. The disc apparatus as claimed in claim 5, wherein said stator includes a plurality of circumferentially spaced coils arranged on said base plate and spaced radially from said motor shaft, and said detecting means is positioned such that the radial distance between said detecting means and said motor shaft is less than the radial distance between said coils and said motor shaft.

* * * * *